(12) United States Patent
Meier et al.

(10) Patent No.: US 10,160,275 B2
(45) Date of Patent: Dec. 25, 2018

(54) SUSPENSION MEMBER FOR A MOTOR VEHICLE AND METHOD OF MAKING SAME

(71) Applicant: Ford Global Technologies, LLC, Dearborn, MI (US)

(72) Inventors: Christoph Meier, Köln (DE); Ivica Papic, Nordrhein Westfalen (DE); Theo Kueppers, Waldfeucht (DE)

(73) Assignee: Ford Global Technologies, LLC, Dearborn, MI (US)

( * ) Notice: Subject to any disclaimer, the term of this patent is extended or adjusted under 35 U.S.C. 154(b) by 0 days.

(21) Appl. No.: 14/932,210

(22) Filed: Nov. 4, 2015

(65) Prior Publication Data

US 2016/0121679 A1    May 5, 2016

(30) Foreign Application Priority Data

Nov. 5, 2014 (DE) .............. 10 2014 222 577
Nov. 5, 2014 (DE) .............. 10 2014 222 579

(51) Int. Cl.
  *B60G 7/00* (2006.01)
  *B21D 53/88* (2006.01)
  *B21D 35/00* (2006.01)

(52) U.S. Cl.
  CPC .............. *B60G 7/005* (2013.01); *B21D 53/88* (2013.01); *B60G 7/001* (2013.01); *B21D 35/001* (2013.01); *B60G 2200/142* (2013.01); *B60G 2204/416* (2013.01); *B60G 2206/10* (2013.01); *B60G 2206/122* (2013.01); *B60G 2206/81* (2013.01); *B60G 2206/811* (2013.01); *B60G 2206/8102* (2013.01); *B60G 2206/8201* (2013.01); *B60G 2206/83* (2013.01)

(58) Field of Classification Search
  CPC .... B60G 7/005; B60G 7/001; B60G 2206/10; B60G 2206/811; B60G 2206/83; B60G 2200/142; B60G 2206/81; B60G 2204/416; B60G 2206/122; B60G 2206/8102; B60G 2206/8201; B21D 53/88; B21D 35/001
  See application file for complete search history.

(56) References Cited

U.S. PATENT DOCUMENTS

| | | | | |
|---|---|---|---|---|
| 5,267,751 A | * | 12/1993 | Hiromoto | ........ B60G 3/10 280/124.134 |
| 7,703,783 B2 | * | 4/2010 | Miyawaki | ........ B60G 7/02 280/124.134 |
| 8,398,102 B2 | * | 3/2013 | Monchiero | ........ B60G 7/001 280/124.125 |
| 8,690,176 B2 | * | 4/2014 | Perry | ........ B21D 53/88 280/124.134 |

(Continued)

FOREIGN PATENT DOCUMENTS

CA      2081936 A1    8/1993
WO   WO2008111723 A1    9/2008

*Primary Examiner* — Darlene P Condra
(74) *Attorney, Agent, or Firm* — Raymond L. Coppiellie; Burgess Law Office, PLLC

(57) ABSTRACT

A suspension member having an arm member and a ball joint section. The ball joint section having an opening receiving a press fit ball joint. The material of the ball joint section having a smaller material thickness than the material of the arm member. The ball joint section connected to the arm member.

8 Claims, 2 Drawing Sheets

(56) References Cited

U.S. PATENT DOCUMENTS

| | | | | |
|---|---|---|---|---|
| 2002/0163151 | A1* | 11/2002 | Timoney | F16C 11/0695 280/80.1 |
| 2006/0290088 | A1* | 12/2006 | Luttinen | B60G 3/265 280/93.51 |
| 2009/0295113 | A1* | 12/2009 | Inoue | B60G 7/001 280/124.134 |
| 2010/0086346 | A1* | 4/2010 | Kruse | B60G 7/001 403/122 |
| 2011/0127743 | A1* | 6/2011 | Musha | B23K 31/00 280/124.1 |
| 2011/0272911 | A1* | 11/2011 | Gerhards | B60G 7/001 280/124.134 |
| 2011/0298192 | A1* | 12/2011 | Yu | B60G 7/001 280/124.134 |
| 2012/0098228 | A1* | 4/2012 | Wilson | B60G 7/001 280/124.134 |

\* cited by examiner

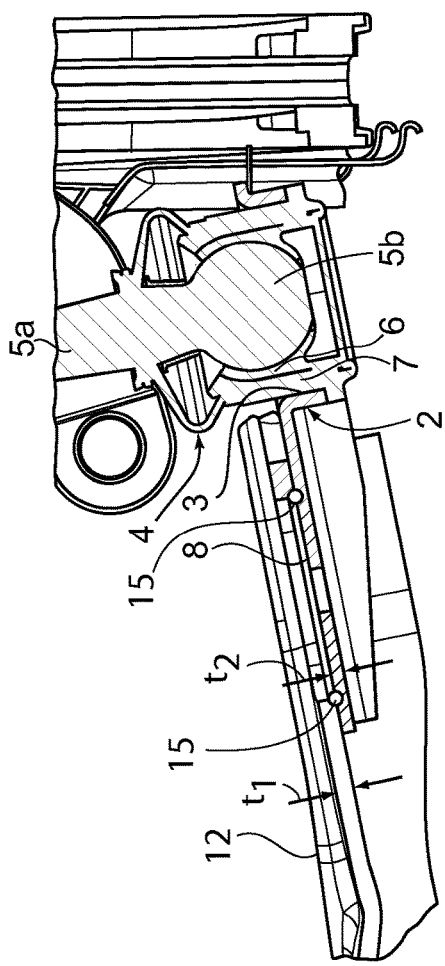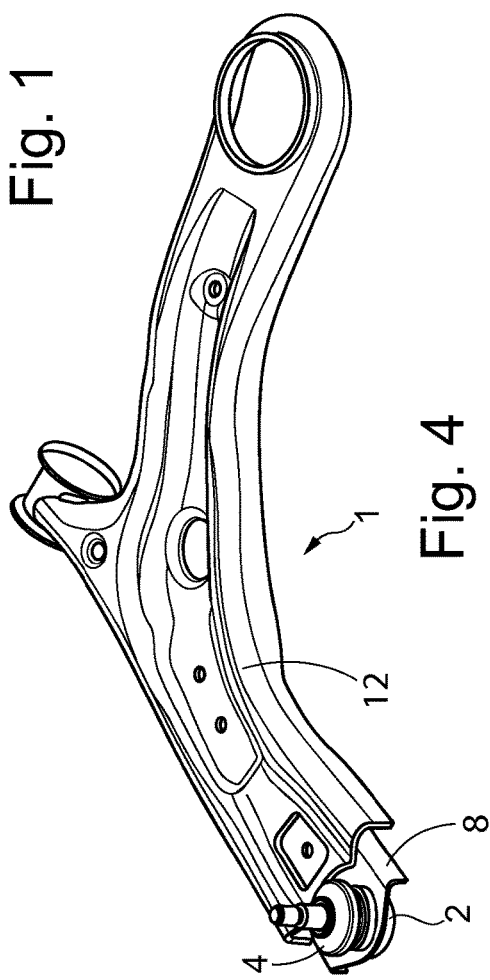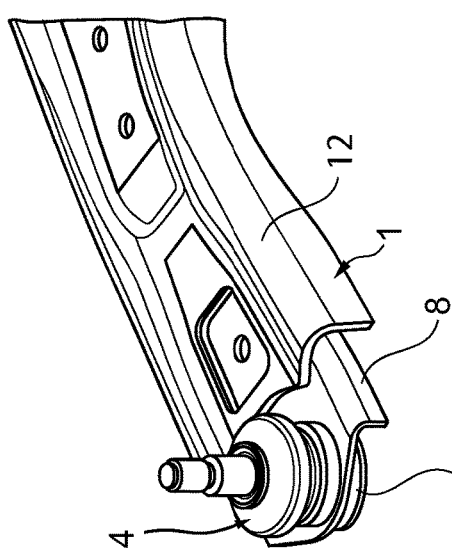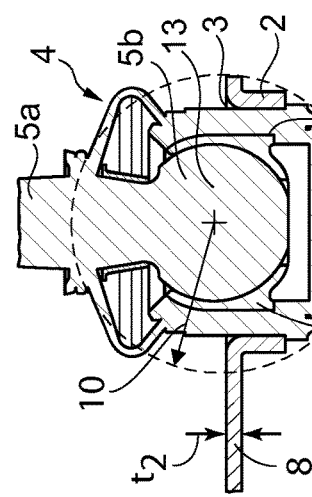

SUSPENSION MEMBER FOR A MOTOR VEHICLE AND METHOD OF MAKING SAME

CROSS-REFERENCE TO RELATED APPLICATIONS

Not Applicable.

BACKGROUND OF THE INVENTION

1. Field of the Invention

The present invention relates to a suspension member for a motor vehicle; and, more specifically, to a suspension member having a structure for receiving a ball joint.

2. Description of Related Art

Wheel suspension arrangements connect the wheels to the chassis or to the self-supporting body of a motor vehicle. In contrast to rigid axles, individual wheel suspension arrangements are composed of separate wheel suspension arrangements on the two sides of a motor vehicle, such that the wheel positions on the two sides do not influence one another. Wheel suspension arrangements are typically constructed from suspension members that fix the wheels horizontally to the chassis or body. Here, the members are compliments of wheel suspension arrangements, in particular of front-wheel suspension arrangements. Sometimes, the members are installed transversely with respect to the direction of travel.

A typical suspension may include a single-shell triangular control arm or transverse link having two connecting arms connected by way of rubber bearings to the body, and one connecting arm connected by way of a joint, typically a ball joint, to a wheel carrier of a wheel.

Ball joints transmit forces in multiple directions and absorb forces from multiple directions. A ball joint is composed substantially of a joint pin, on one end of which there is formed a ball, of a shell which receives the ball of the pin, and of a joint housing which accommodates the shell and parts of the ball pin. The ball of the ball pin slides in the prestressed, permanently lubricated shell, which is protected against moisture and dirt by the housing.

The connection of the ball joint housing to a corresponding suspension member may be realized for example by way of a press-fit connection, a welded connection, a screw connection, a rivet connection and the like. A press-fit connection is a low cost variant. However, a press-fit connection requires a large space in relation to other connection types. The large space requirement arises owing to the large material thickness of the wall of the press-fit seat, in particular the resulting large bend radius of the material. The press-fit seat is typically a deep-drawn cylinder in the material of the link.

Owing to the large space requirement, a press-fitted ball joint must inevitably be arranged further to the inside in relation to the vehicle dimensions than other methods. This has an adverse effect on the steering characteristics of the vehicle, as the steering offset is not optimally configured.

SUMMARY OF THE INVENTION

A first example of the invention is a suspension member including a ball joint section having an opening for receiving a ball joint, wherein a wall of the ball joint section has, in the region provided for friction or press-fit contact with the ball joint, a smaller material thickness than the material of an arm or link section of the suspension member.

Furthermore, a method of forming a suspension member for a motor vehicle is disclosed, in particular, a control arm or transverse link. The method includes providing a sheet-metal plate as a starting material of an arm or link section and providing a sheet-metal plate as a starting material of a ball joint section. Cutting shapes from the respective sheet-metal plates corresponding to the basic shapes of the arm or link section and of the ball joint section. Deforming the respective metal sheets in respective forming tools to form the arm or link section and the ball joint section. Connecting the ball joint section to the actual arm or link section. Wherein the respective metal sheets are of different material thickness whereby the ball joint section has a different material thickness than the material thickness of the arm or link section.

In one example, the ball joint section has a material thickness smaller than the material thickness of the arm or link member. In this way, it is advantageously possible, without impairment of the stability of the control arm or transverse link, for the press-fit connection between the ball joint section and ball joint to be arranged closer to the wheel carrier and thus closer to the brake disk than with conventional press-fit connections.

Further areas of applicability of the present invention will become apparent from the detailed description provided hereinafter. It should be understood that the detailed description and specific examples, while indicating the preferred embodiment of the invention, are intended for purposes of illustration only and are not intended to limit the scope of the invention.

BRIEF DESCRIPTION OF THE DRAWINGS

The present invention will become more fully understood from the detailed description and the accompanying drawings, wherein:

FIG. 1 shows a cross-sectional view of an exemplary embodiment of a control arm or transverse link according to the invention, with a press-fit ball joint in a ball joint section for receiving the ball joint.

FIG. 2 shows a cut-away view of the ball joint section and ball joint per FIG. 1.

FIG. 3 shows an enlarged perspective view of ball joint section of the control arm or transverse link per FIG. 4.

FIG. 4 shows a perspective view of the control arm or transverse link according to an exemplary embodiment of the invention.

DETAILED DESCRIPTION OF THE PREFERRED EMBODIMENTS

Figure 5:
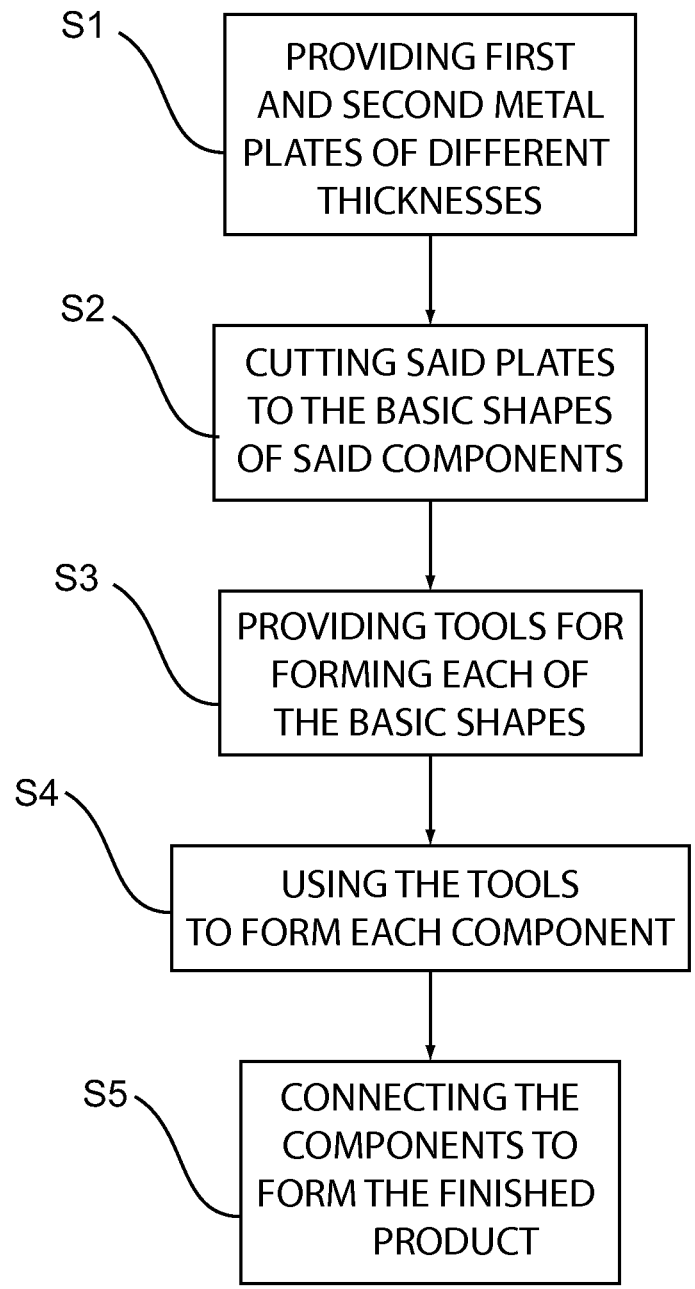
FIG. 5 shows a flow diagram of an exemplary embodiment of a method according to the invention.

The following description of the preferred embodiment(s) is merely exemplary in nature and is in no way intended to limit the invention, its application, or uses.

FIG. 1 illustrates a control arm or transverse link, seen generally at 1, including a control arm or link member 12 and a connecting member 8. The connecting member 8 includes a ball joint section 2 and a ball joint 4, including a joint pin 5*a*, ball 5*b*, ball shell 6 and housing 7, press-fit into the ball joint section 2. The control arm or link member 12 and connecting member 8 combine to form the control arm or transverse link 1. As illustrated in FIG. 4, the connecting member 8 includes a ball joint section 2. The connecting member 8 and correspondingly the ball joint section 2 have a smaller material thickness (t2) than the material thickness (t1) of the arm or link member 12. The smaller material thickness (t2) amounting to approximately half of the material thickness (t1) of the arm or link member 12. It is however also possible for only individual regions of the ball joint section 2, in particular the region provided for the friction or press-fit contact with the ball joint 4, to have the smaller material thickness (t2). The term material thickness refers to the thickness of the material, preferably of the metal sheet, in cross section.

In an exemplary example, arm or link member 12 has a material thickness (t1) approximately 4 mm thick, wherein the ball joint section 2 is preferably produced with a material thickness (t2) of 2 mm. Further preferred material thicknesses of the ball joint section 2 are 3.5 to 3 mm, 2.9 mm, 2.8 mm, 2.7 mm, 2.6 mm, 2.5 mm, 2.4 mm, 2.3 mm, 2.2 mm and 2.1 mm. When the a material thicknesses (t1) of the arm or link member 12 changes, for example increases, the material thicknesses (t2) of the ball joint section 2 changes proportionately. Because the ball joint section 2 has a smaller material thickness (t2) than the material thickness (t1) of the arm or link member 12, it is advantageously possible, without impairment of the stability of the control arm or transverse link 1, for the press-fit connection between the ball joint section 2 and ball joint 4 to be arranged closer to the wheel carrier and thus closer to the brake disk than with conventional press-fit connections.

As illustrated, the ball joint section 2 connects to the arm or link member 12 through connecting member 8. Connecting member 8 preferably has a material thickness smaller than the arm or link member 12. Here, the connecting member 8 has the same material thickness as the ball joint section 2. It is possible for the connecting member 8 to have a different material thickness, for example the same material thickness as, or a greater material thickness than, the arm or link member 12.

FIG. 2 illustrates the ball joint section 2, for example, including a press-fit seat 2 with a press-fitted ball joint 4. The press-fit seat 2 is produced as a metal-sheet rim hole or downwardly depending flange produced by punching, alternatively by plunging. Other methods are also possible for producing the press-fit seat 2, such as, for example by deep drawing. The press-fit seat 2 in the exemplary embodiment is a downwardly depending flange forming a tube produced by plunging. The tube defines an opening 3, for the friction or press-fit contact with the ball joint 4 positioned in the opening 3 of the press-fit seat 2.

Because the ball joint section 2 has a smaller material thickness (t2) than the material thickness (t1) of the arm or link member 12 the press-fit connection between the ball joint section 2 and the ball joint 4 places the ball joint closer to the wheel carrier and brake disk. Specifically, the smaller material thickness (t2) of the downwardly depending flange positions the ball joint 4 closer to the wheel carrier and brake disk.

As illustrated in FIG. 2, the circle 9 denotes clearance of the structure of the control arm or transverse link 1 exhibited by connecting member 8 and the ball joint section 2 with the press-fitted ball joint 4. The arrow 10 denotes the distance from the center of the ball joint 4, which is identical to the center of the ball 5b, to the furthest extending portion or outer boundary of the ball joint section 2 attached by the connecting member 8 to the arm or link member 12. The dashed circular line denotes a region in which outwardly protruding material has been severed off to reduce the outer diameter or furthest extending portion of the ball joint section 2.

In the disclosed example, the material of the arm or link member 12 is preferably a metal sheet, a flat workpiece composed of metal, preferably a steel sheet. The structure of the arm or link member 12 with all necessary shapes is conventionally produced in a tool designed for carrying out all necessary machining processes. Connecting member 8 and correspondingly the ball joint section 2, which receives a ball joint 4, is likewise manufactured from a metal sheet, preferably from a steel sheet, and particularly preferably from the same material as the arm or link member 12. The smaller material thickness (t2) of the connecting member 8 and ball joint section 2 is advantageous because it permits a press-fit connection to the ball joint 4 with a smaller outer diameter in relation to conventional press-fit connections. In this way, the ball joint section 2, with a smaller width, that is to say smaller outer diameter, provides a friction or press-fit contact with the ball joint 4 with a smaller space requirement. The steering characteristics of the vehicle are positively influenced because the steering offset and the disturbance force lever arm can be optimally configured.

The arm or link member 12 is preferably produced from a single sheet-metal plate. In the disclosed example preferably deformation by punching, though the arm or link member 12 may also be produced, in a progressive tool, by way of further deformation methods such as for example bending, flow pressing, extrusion, pulling-through, deep drawing or plunging. Similarly, connecting member 8 and the ball joint section 2 is preferably produced from a single sheet-metal plate; preferably through deformation by punching, while recognizing that further deformation methods are also suitable. It is furthermore preferable for the arm or link member 12 to be produced in single-shell form. The production of single-shell arm or link member 12 is advantageously inexpensive, and single-shell arm or link member 12 are simple but stable structures and are distinguished by a low weight.

It is preferably the case that the material thickness (t2) of the connecting member 8 and ball joint section 2 in the region provided for the friction or press-fit contact with the ball joint 4 is approximately half that of the material thickness (t1) of the arm or link member 12. The material of the connecting member and the ball joint section 2 is approximately half as thick as that of the arm or link member 12 to which the connecting member 8 and corresponding ball joint section 2 is attached.

The ball joint section 2 preferably has the smaller material thickness (t2) over its entire extent. This means that not only the region provided for the friction or press-fit contact with the ball joint, but the connecting member 8 and the ball joint section 2. For example the connecting member 8 by which said ball joint section 2 is connected to the arm or link member 12, are approximately half as thick as the arm or link member 12.

It is furthermore preferable if the region provided for the friction or press-fit contact with the ball joint 4 is the opening 3 of the ball joint section 2 formed by plunging. In this example, the opening 3 part of the region of the ball joint section 2 in which there is close contact, which effects locking of the press-fit connection, between the ball joint 4 and the ball joint section.

The opening 3 is preferably in the form of a pilot hole, a so-called metal-sheet rim hole. Metal-sheet rim hole refers to a drawn collar or flange extending, in the disclosed example downwardly, from the hole on the metal sheet. The advantage lies in the stability and the inexpensive production from the material of the ball joint section 2 by a drawing punch extending through the material of the ball joint section 2. The opening 3 may also be formed by other methods, for example by deep drawing.

After forming the arm or link member 12 and connecting member 8, and correspondingly the ball joint section 2, the two are connected to one another. The connection between the arm or link member 12 and connecting member 8 is preferably a welded connection 15. Alternatively, the connection may also be a riveted connection, an adhesive connection, or a fastener/screw connection.

Preferably, the connecting member 8 is welded to the arm or link member 12. The preferred steel sheets of the arm or link member 12 and of the connecting member 8 are suitable for welding. Welding is advantageous because it imparts a high level of stability to the connection and because the preferred steel sheets of the arm or link member 12 and of the connecting member 8 and corresponding ball joint section 2 are suitable for welding. Various welding methods are conceivable which are suitable for the dimensions of the connection and for the size of the parts to be connected.

In the region of the friction or press-fit contact of the ball joint section 2 with the ball joint 4, preferably in the region of the opening 3 of the ball joint section 2, it is advantageously the case that material protruding outward in a radial direction in the region of the opening of the ball joint section 2 is severed off. Severing material not required reduces of the outer diameter of the ball joint section, and thus its space requirement. By outwardly protruding material being severed off, it is possible for the press-fit connection between the ball joint section and ball joint to likewise be arranged closer to the wheel carrier and to the brake disk than with conventional press-fit connections.

FIG. 3 illustrates the ball joint section 2 of the connecting arm 8 with a press-fitted ball joint 4 attached to the arm or link member 12. Here, the ball joint 4 has been press-fit into the opening 3 of the ball joint section 2. The ball joint section 2 is connected to the arm or link member 12 by way of the connecting member 8.

FIG. 4 illustrates an overall view of the control arm or transverse link member 1 with a press-fitted ball joint 1. Here, the ball joint 4 has been press-fit into the opening 3 of the ball joint section 2. The ball joint section 2 is connected to the arm or link member 12 by way of the connecting member 8.

FIG. 5 illustrates a method, according to one example of the invention, for producing control arm or transverse link 1. In step S1, first and second sheet-metal plates are provided as a starting material of the arm or link member 12 and of the connecting member 8 and corresponding ball joint section 2, wherein sheet-metal plates of different material thickness are used in each case. Here, the sheet-metal plate for the production of the connecting member 8 and corresponding ball joint section 2 has a smaller material thickness (t2) than the material thickness (t1) of the sheet-metal plate for the production of the arm or link member 12. The preferred material thicknesses of the metal sheets correspond to the material thicknesses mentioned above.

In step S2, shapes are cut out, preferably punched out, of the respective sheet-metal plates. The shapes forming the basic shapes of the arm or link member 12 and of the connecting member 8 and corresponding ball joint section 2. Aside from punching, other methods, for example cutting, are also conceivable for producing the shapes from the sheet-metal plate.

In step S3, the method includes providing two tools, one tool for forming the cut out shape corresponding to the arm or link member 12, and a second tool for forming the other or second cut out shape corresponding to the connecting member 8 and corresponding ball joint section 2.

In step S4, the metal sheets are each deformed in the corresponding tools to form the arm or link member 12 and the connecting member and corresponding ball joint section 2. The tools are preferably designed for punching, or for other deformation methods such as bending, flow pressing, extrusion, pulling-through, deep drawing and plunging. The disclosed methods may be combined with one another and with further methods. The tools may also be progressive forming tools. In step S4, unnecessary outwardly protruding material of the ball joint section 2 is also severed off to further reduce the outer diameter of the ball joint section 2; specifically to reduce furthest extending portion of the ball joint section 2. Therefore, if not required for the stability of the ball joint seat 1, and of the control arm or transverse link 22, excess outwardly protruding material of the ball joint section 2, that is the material between the ball joint seat 1 and the wheel carrier and brake disk, is removed.

In step S5, the arm or link member 12 and connecting member 8, and corresponding ball joint section 2, are connected to one another to complete the control arm or transverse link 1. The connection is produced by welding the metal sheets of the arm or link member 12 and connecting member 8 to one another. Alternatively, the metal sheets may be connected with rivets, adhesive, or mechanical fasteners.

The method according to the invention is advantageous because, by way of the connection of a ball joint section 2 for receiving a ball joint 4, which means has a reduced material thickness (t2) in relation to the material thickness (t1) of the arm or link member 12. It is possible in a relatively simple manner to produce a control arm or transverse link 1 having an outer diameter of the press-fit connection smaller than that of conventional press-fit connections. The reduced outer diameter yields a smaller space requirement.

The description of the invention is merely exemplary in nature and, thus, variations that do not depart from the gist of the invention are intended to be within the scope of the invention. Such variations are not to be regarded as a departure from the spirit and scope of the invention.

What is claimed is:

1. A suspension member for a motor vehicle comprising:
   an arm member having an open cross section formed of a metal sheet having a material thickness;
   a ball joint section having a material thickness and an opening for receiving a ball joint; and
   said material thickness of said ball joint section being smaller than said material thickness of said arm member in said open cross section.

2. A suspension member for a motor vehicle comprising:
   an arm member having a material thickness;
   a ball joint section having a material thickness and an opening for receiving a ball joint;
   said material thickness of said ball joint section being smaller than said material thickness of said arm member; and
   wherein said arm member is of single-shell form.

3. The suspension member of claim 2 wherein the material thickness of said ball joint section in the area adjacent said opening provided for receiving the ball joint is approximately half that of the material thickness of said arm member.

4. The suspension member of claim 2 wherein the material thickness of said ball joint section is smaller over its entire extent than the material thickness of said arm member.

5. The suspension member of claim 2 wherein the material thickness of said ball joint section adjacent said opening in said ball joint section for receiving said ball joint is less than the material thickness of said arm member.

6. The suspension member of claim 2 wherein said opening is defined by an outwardly extending flange portion, said flange portion formed from the material of said ball joint section whereby the material thickness of said flange portion is smaller than the material thickness of said arm.

7. The suspension member of claim 2 wherein said ball joint section is welded to said arm member.

8. The suspension member of claim 2 wherein said ball joint is press-fit into said opening in said ball joint section.

* * * * *